(No Model.)

R. L. RILEY.
ASH SIFTER.

No. 575,494. Patented Jan. 19, 1897.

WITNESSES
John Buckler,
C. Grist

INVENTOR
Robert L. Riley
BY
Edgar Tate & Co
ATTORNEYS.

UNITED STATES PATENT OFFICE.

ROBERT LESLIE RILEY, OF NEWBURG, NEW YORK.

ASH-SIFTER.

SPECIFICATION forming part of Letters Patent No. 575,494, dated January 19, 1897.

Application filed October 31, 1896. Serial No. 610,747. (No model.)

*To all whom it may concern:*

Be it known that I, ROBERT LESLIE RILEY, a citizen of the United States, residing at Newburg, in the county of Orange and State of New York, have invented certain new and useful Improvements in Ash-Sifters, of which the following is a full and complete specification, such as will enable those skilled in the art to which it appertains to make and use the same.

This invention relates to ash-sifters; and the object thereof is to provide an improved device of this class which is simple in construction and operation and by means of which cinders, charred coal, and similar substances may be quickly and easily removed from the ashes, a further object being to provide an improved device of this class which may be operated without producing dust or dirt in the compartment where it is used.

The invention is fully disclosed in the following specification, of which the accompanying drawings form a part, in which—

Figure 1:
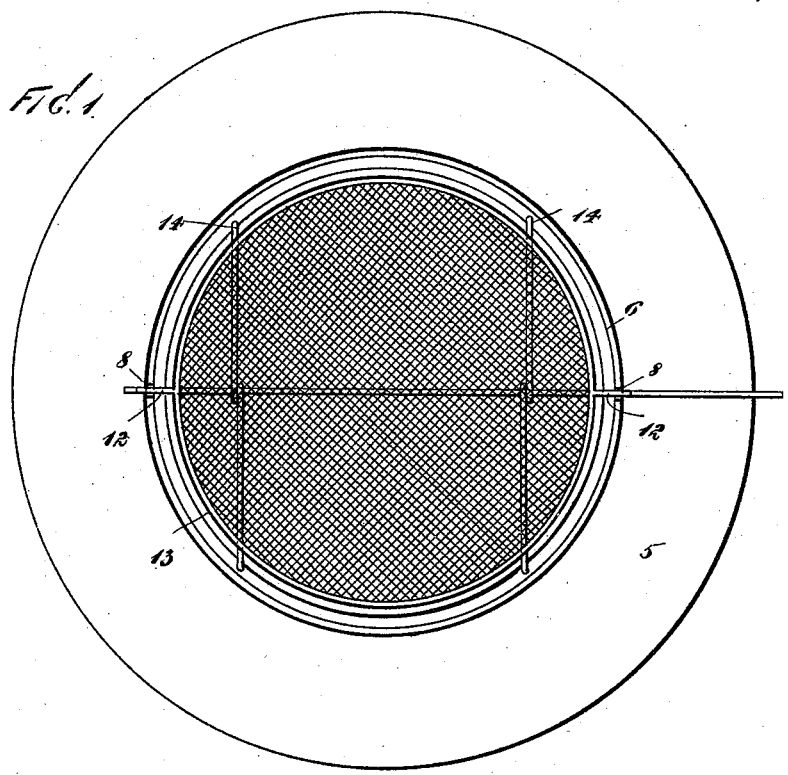
Figure 2:
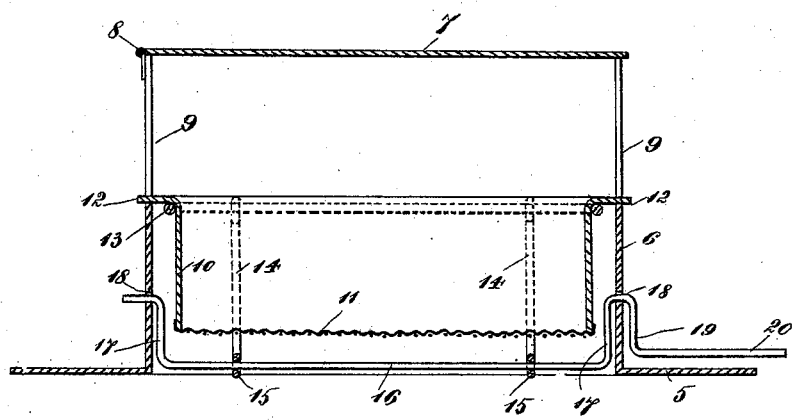

Figure 1 is a plan view of my improved ash-sifter with the cover removed, and Fig. 2 a central vertical section thereof.

In the following specification the various parts of my improved ash-sifter are indicated in each of the views by similar numerals of reference, and in the practice of my invention I provide an ash-sifter which comprises an annular base 5, on which is formed an upwardly-directed cylindrical casing 6, which is provided with a cover 7, which is hinged thereto at one side, as shown at 8, and the upper opposite side walls of the cylindrical casing 6 are provided with deep slots 9. I also provide an ash-receiver which consists of a circular casing 10, which is adapted to be mounted in the cylindrical casing 6, and which is provided with a perforated or wire-mesh bottom 11 and at the opposite sides of the top thereof with outwardly-directed arms 12, which project through the slots 9.

In practice the ash-receiver is mounted in and operated in the cylindrical casing 6, and for this purpose I provide a frame which consists of a ring 13, which passes around the top of the circular casing 10 of the receiver, and with which are connected at different points wires or rods 14, which are carried down around the bottom of the receiver and upwardly on the opposite sides and again connected with the ring 13, and formed centrally of the bottom portion of these wires or rods are loops or rings 15, through which is passed a shaft 16, which is carried upwardly within the casing 6 at each end, as shown at 17, and passed through holes or openings 18 in the opposite sides of said casing, and formed on one end thereof is a crank 19, provided with a handle 20.

In practice the ash-receiver is dropped into the supporting and operating frame and sustained as shown in Fig. 2, and in practice the ashes are placed in the receiver, and then by turning or operating the crank 19 the rod 16 will be turned in a circle and the supporting or operating frame will be moved up and down vertically within the casing 6, the arms 12 moving in the slots 9, and at the same time said receiver will be oscillated laterally, as will be readily understood, by reason of the connection of the rods or wires 14 of the supporting or operating frame with the shaft 16.

My improved ash-sifter is simple in construction and perfectly adapted to accomplish the result for which it is intended, and by reason thereof the ashes may be sifted or separated from the charred coal, cinders, or other substances, and said sifter may be used in connection with a barrel or other receptacle for receiving the ashes, the annular base 5 being placed on or over said receptacle.

Having fully described my invention, I claim as new and desire to secure by Letters Patent—

1. The herein-described ash-sifter which comprises an annular base, a main cylindrical casing formed thereon, and provided with vertical slots in its opposite side walls which open upwardly, and with a hinged cover, said cylindrical casing being also provided with an ash-receiver which is circular in form, and provided with a perforated or reticulated bottom, and at its top with side arms which project through the slots in the casing, and a support and means for operating said ash-receiver, consisting of a ring which passes around the top thereof, below said arms, and which is connected at different points with wires or rods which are carried downwardly beneath the bottom of the receiver and upwardly on the opposite side, and again connected with the ring, said wires or rods being provided centrally of the bottom of the receiver with loops or eyes through which is passed a shaft, the ends of which are carried upwardly, and passed outwardly, through the opposite sides of the main cylindrical casing, and one end of said shaft being provided with a crank, substantially as shown and described.

2. The herein-described ash-sifter which comprises an annular base, a cylindrical casing formed thereon, and provided with vertical slots in its opposite side walls, and with a hinged cover, said cylindrical casing being also provided with a perforated or reticulated bottom, and at its top with side arms which project through the slots in the casing, and means for moving said receiver vertically and for oscillating the same, consisting of a wire supporting-frame in which the receiver is mounted, and which is provided with transverse wires at the bottom thereof, through which passes a shaft the ends of which are bent upwardly and passed out through the sides of the cylindrical casing, substantially as shown and described.

In testimony that I claim the foregoing as my invention I have signed my name, in presence of the subscribing witnesses, this 26th day of October, 1896.

ROBERT LESLIE RILEY.

Witnesses:
CHAS. R. JOHNSTON,
WM. E. WOERTERDYKE.